United States Patent
Sternby et al.

(10) Patent No.: US 9,026,428 B2
(45) Date of Patent: May 5, 2015

(54) TEXT/CHARACTER INPUT SYSTEM, SUCH AS FOR USE WITH TOUCH SCREENS ON MOBILE PHONES

(71) Applicant: Nuance Communications, Inc., Burlington, MA (US)

(72) Inventors: Jakob Sternby, Lund (SE); Lars Jonas Morwing, Malmo (SE); Jonas Andersson, Malmo (SE); Christer Friberg, Lund (SE)

(73) Assignee: Nuance Communications, Inc., Burlington, MA (US)

( * ) Notice: Subject to any disclaimer, the term of this patent is extended or adjusted under 35 U.S.C. 154(b) by 367 days.

(21) Appl. No.: 13/652,222

(22) Filed: Oct. 15, 2012

(65) Prior Publication Data

US 2014/0108004 A1    Apr. 17, 2014

(51) Int. Cl.
*G06F 17/27* (2006.01)
*G06F 17/24* (2006.01)
*G06F 3/0488* (2013.01)
(Continued)

(52) U.S. Cl.
CPC .......... *G06F 17/2785* (2013.01); *G06F 17/242* (2013.01); *G06F 3/04883* (2013.01); *G06F 3/018* (2013.01); *G06F 3/0237* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775

USPC ............ 704/1, 9, 10; 707/706–708; 382/186, 382/187
See application file for complete search history.

(56) References Cited

U.S. PATENT DOCUMENTS 6,285,785 B1 *   9/2001   Bellegarda et al. ........... 382/187
6,307,549 B1    10/2001   King et al.
(Continued)

FOREIGN PATENT DOCUMENTS

JP    2000123114 A    4/2000
JP    2000200143 A    7/2000
(Continued)

OTHER PUBLICATIONS

International Search Report and Written Opinion for International Application No. PCT/US2013/064717, mailing date Jan. 22, 2014, 9 pages.

(Continued)

*Primary Examiner* — Lamont Spooner
(74) *Attorney, Agent, or Firm* — Perkins Coie LLP

(57) ABSTRACT

A system and method for receiving character input from a user includes a programmed processor that receives inputs from the user and disambiguates the inputs to present character sequence choices corresponding to the input characters. In one embodiment, a first character input is received and a corresponding first recognized character is stored in a temporary storage buffer and displayed to the user for editing. After a predetermined number of subsequent input characters and/or predetermined amount of time without being edited, the system determines that the first recognized character is the intended character input by the user and removes the first recognized character from the buffer, thereby inhibiting future editing.

20 Claims, 12 Drawing Sheets

(51) Int. Cl.
*G06F 3/01* (2006.01)
*G06F 3/023* (2006.01)

(56) References Cited

U.S. PATENT DOCUMENTS

| | | | |
|---|---|---|---|
| 7,177,473 B2 | 2/2007 | Aharonson | |
| 7,457,466 B2 * | 11/2008 | Williamson et al. | 382/187 |
| 7,610,189 B2 | 10/2009 | Mackie | |
| 7,756,335 B2 | 7/2010 | Sternby | |
| 7,894,641 B2 * | 2/2011 | Yaeger et al. | 382/119 |
| 7,974,979 B2 * | 7/2011 | Qiu et al. | 707/748 |
| 8,036,645 B2 | 10/2011 | Roundtree et al. | |
| 2002/0150295 A1 * | 10/2002 | Kwok et al. | 382/186 |
| 2003/0101163 A1 * | 5/2003 | Lui et al. | 707/1 |
| 2004/0049388 A1 * | 3/2004 | Roth et al. | 704/251 |
| 2005/0038657 A1 * | 2/2005 | Roth et al. | 704/260 |
| 2005/0043947 A1 * | 2/2005 | Roth et al. | 704/236 |
| 2005/0043949 A1 * | 2/2005 | Roth et al. | 704/251 |
| 2005/0159948 A1 * | 7/2005 | Roth et al. | 704/233 |
| 2005/0159950 A1 * | 7/2005 | Roth et al. | 704/236 |
| 2006/0274051 A1 | 12/2006 | Longe et al. | |
| 2006/0277159 A1 * | 12/2006 | Napper et al. | 707/3 |
| 2007/0286486 A1 * | 12/2007 | Goldstein | 382/187 |
| 2008/0195388 A1 * | 8/2008 | Bower et al. | 704/243 |
| 2008/0244446 A1 | 10/2008 | LeFevre et al. | |
| 2009/0228273 A1 * | 9/2009 | Wang et al. | 704/235 |
| 2010/0121870 A1 | 5/2010 | Unruh et al. | |
| 2010/0131900 A1 * | 5/2010 | Spetalnick | 715/825 |
| 2012/0114245 A1 * | 5/2012 | Lakshmanan et al. | 382/186 |
| 2012/0117506 A1 * | 5/2012 | Koch et al. | 715/773 |
| 2012/0290287 A1 * | 11/2012 | Fux et al. | 704/8 |

FOREIGN PATENT DOCUMENTS

| | | |
|---|---|---|
| JP | 2007316931 A | 12/2007 |
| JP | 2012048589 A | 3/2012 |
| JP | 2012145971 A | 8/2012 |
| WO | WO-2011013057 | 9/2011 |

OTHER PUBLICATIONS

Stroke (CJK character) [online], Wikipedia, [retrieved on Mar. 8, 2012]. Retrieved from the Internet: URL: https://en.wikipedia.org/wiki/Stroke_(CJKV_character), 9 pages.

* cited by examiner

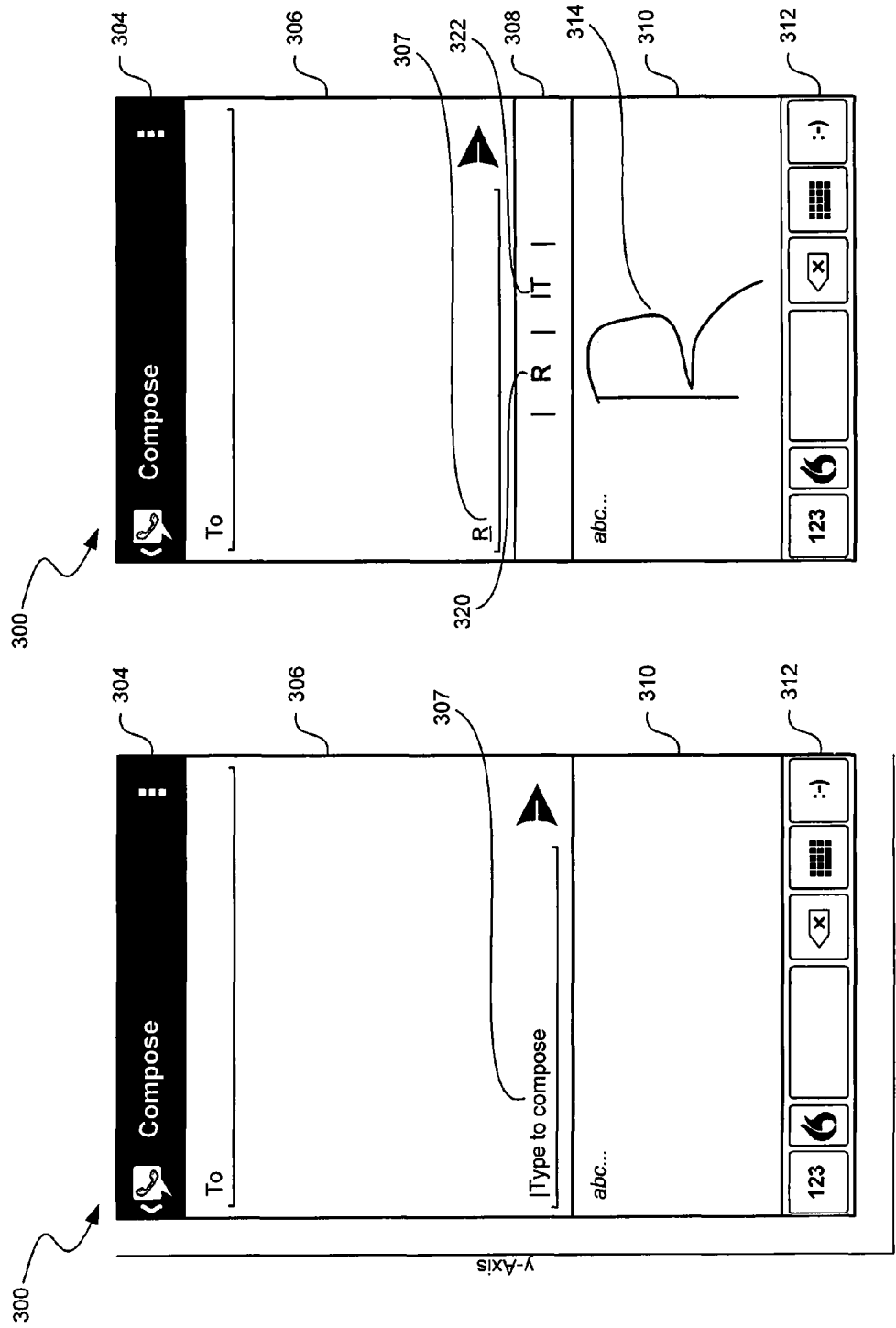

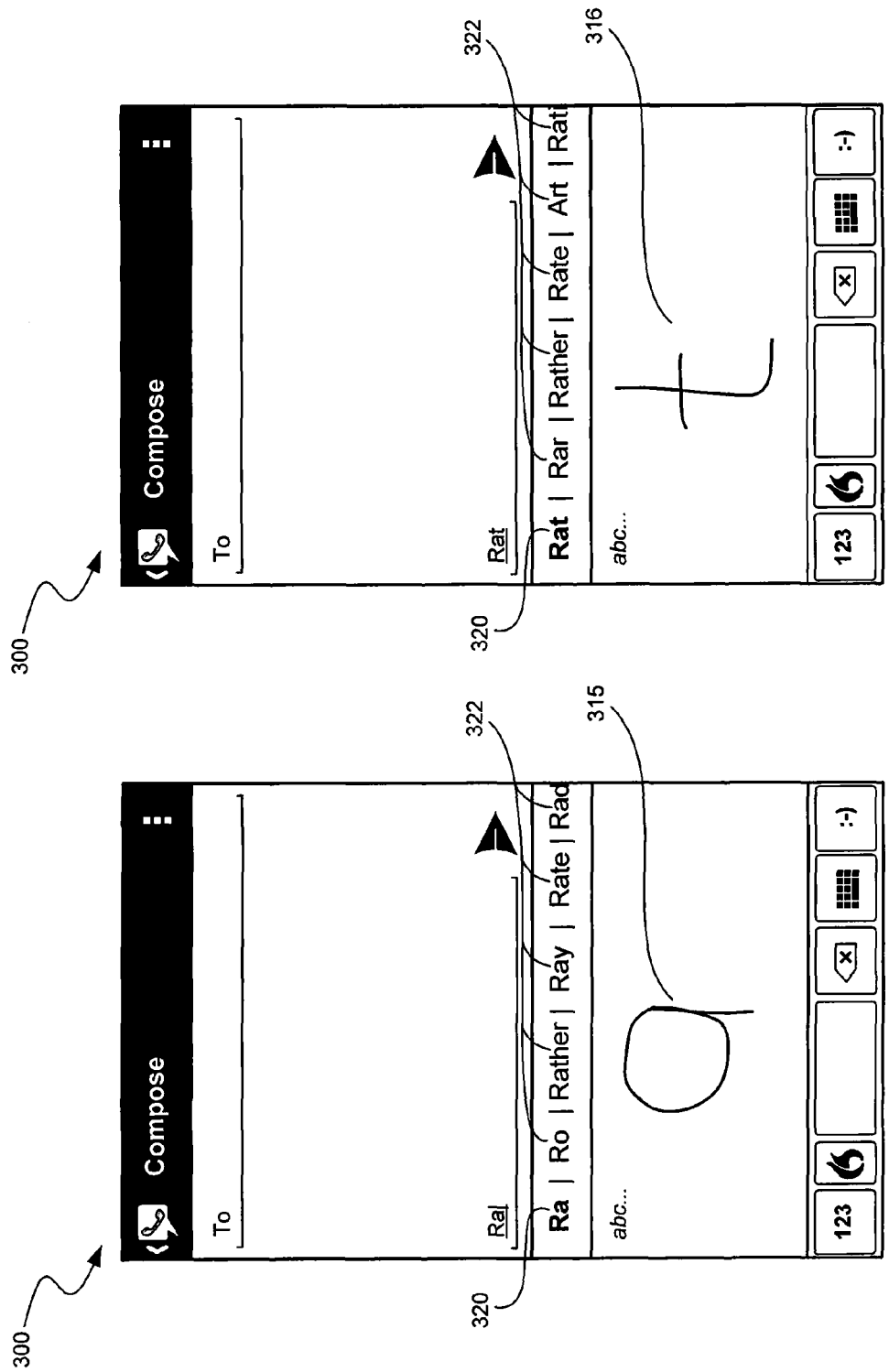

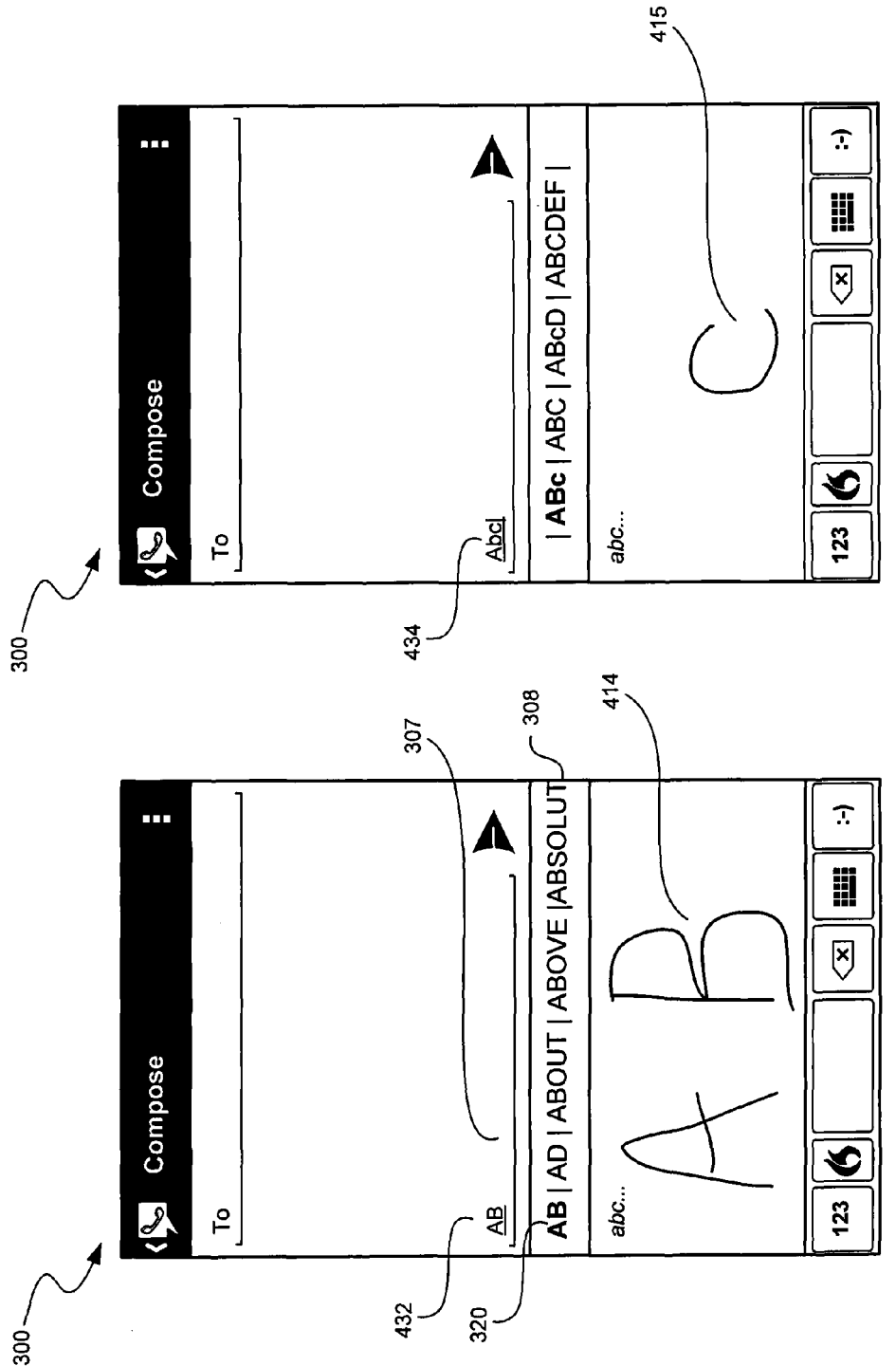

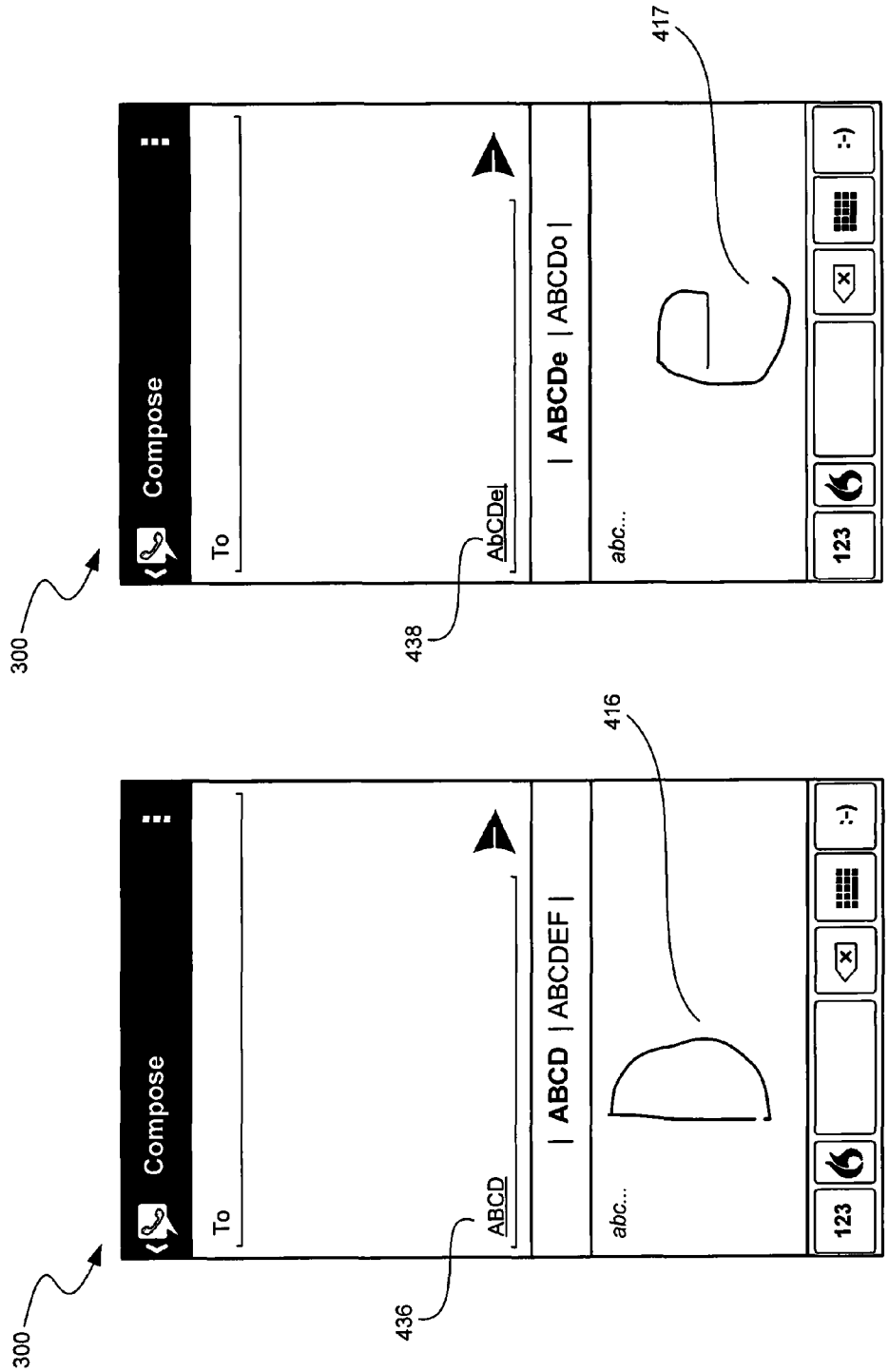

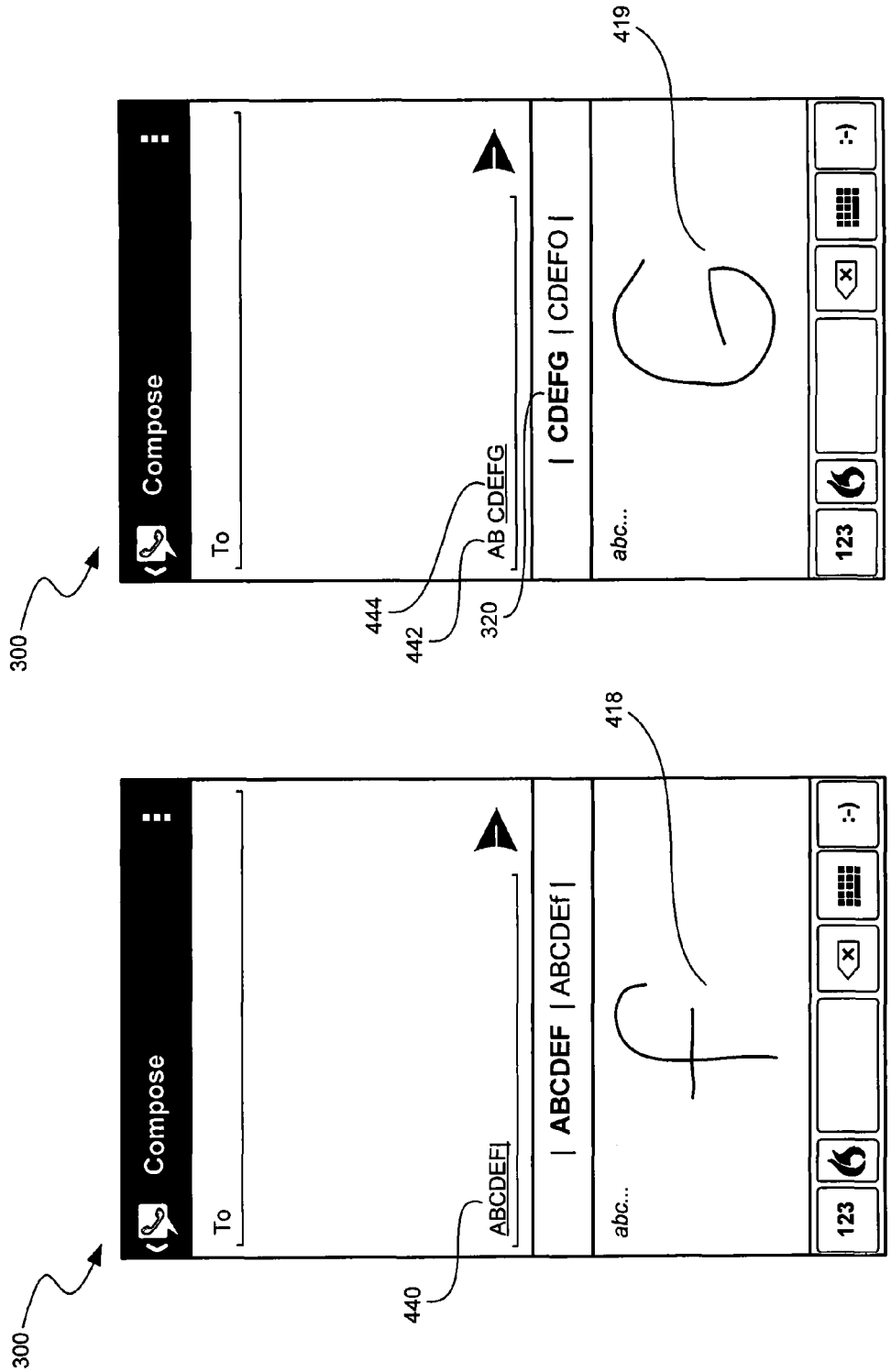

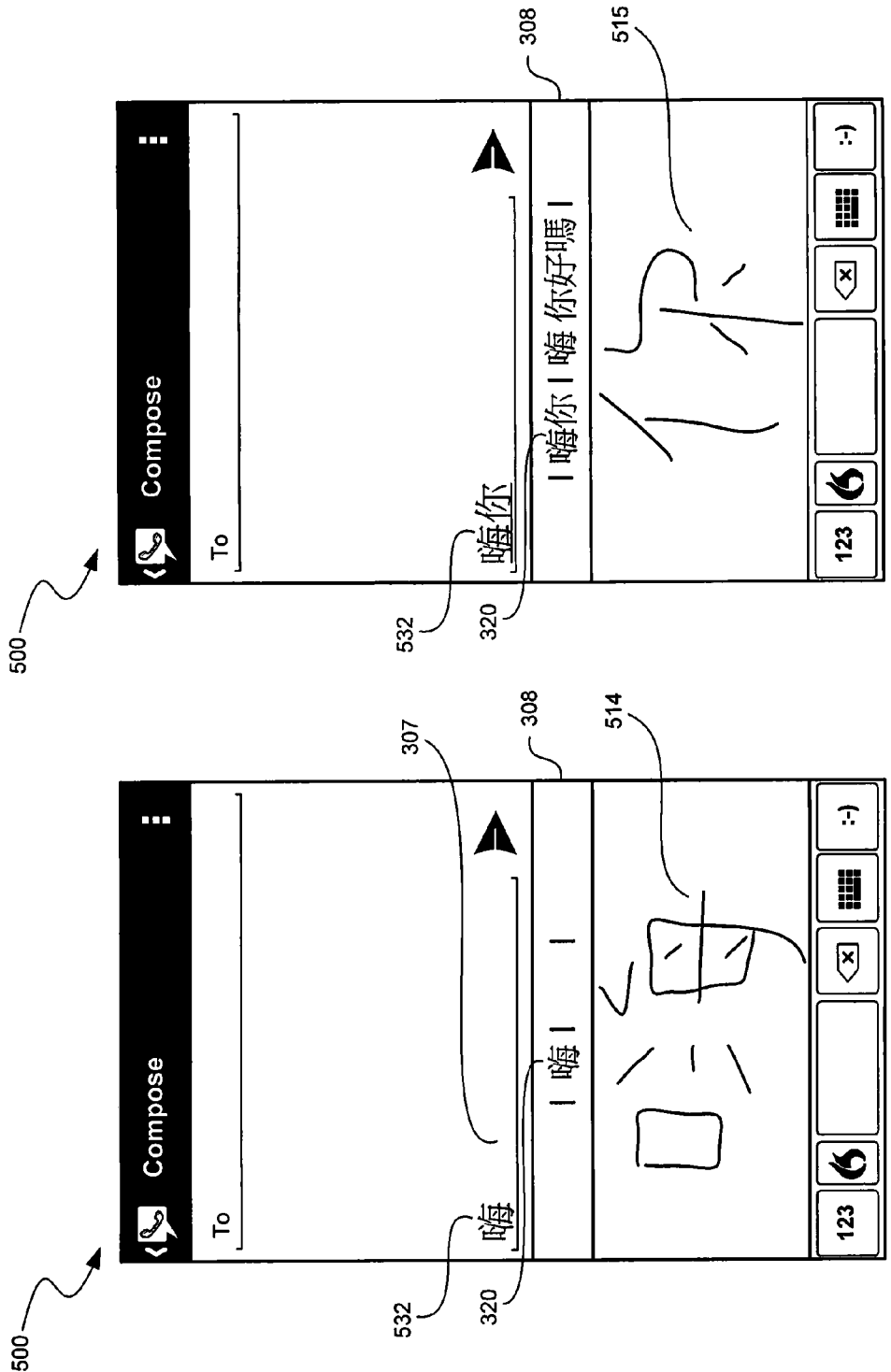

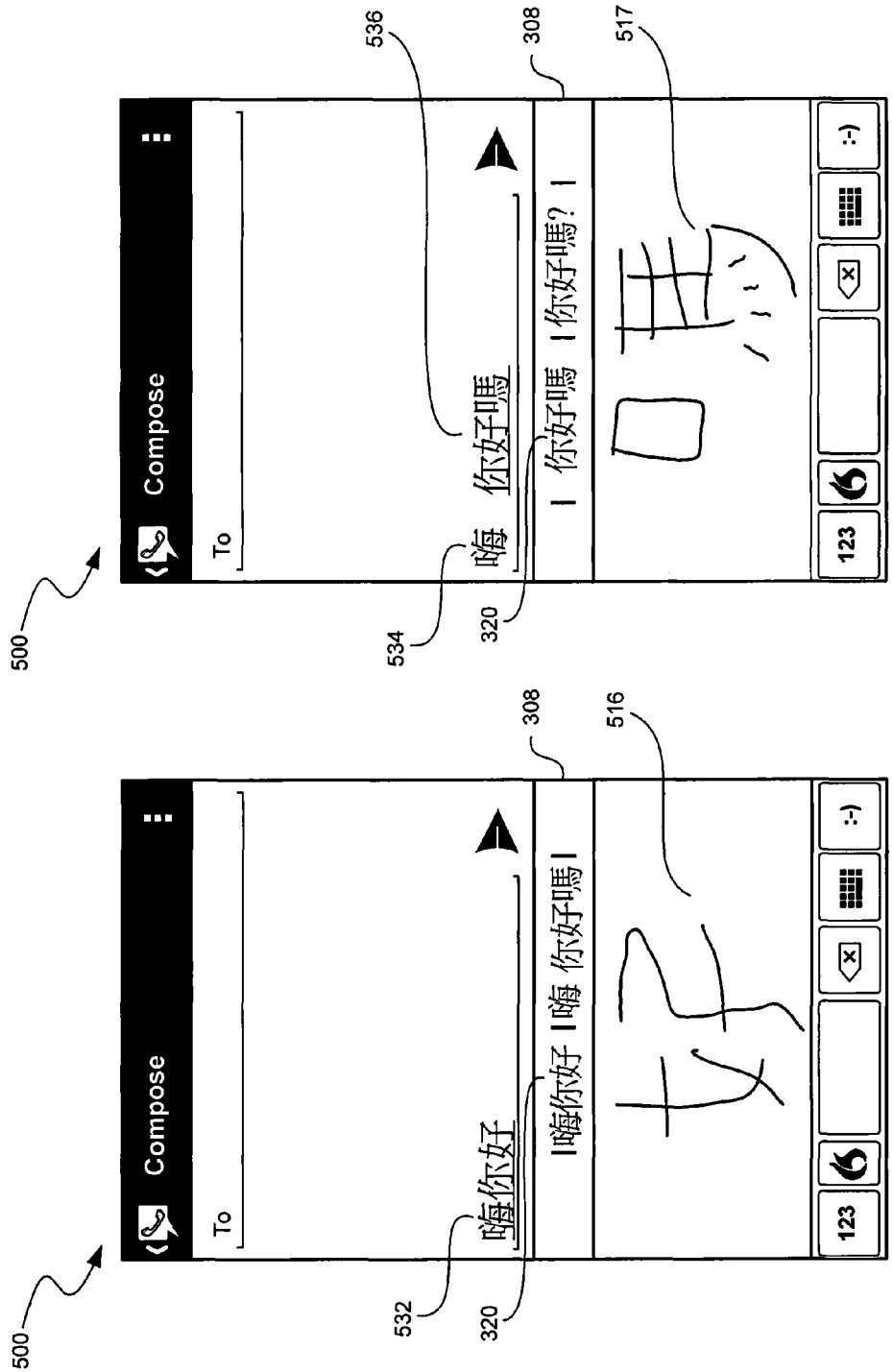

TEXT/CHARACTER INPUT SYSTEM, SUCH AS FOR USE WITH TOUCH SCREENS ON MOBILE PHONES

BACKGROUND

Users enter text into computers and other data processing systems using a variety of input devices, including many types of keyboards. Most standard keyboards are large so as to accommodate both hands of a typist, but this leads to a less portable device. Laptop computers have attempted to shrink the size of a keyboard, sometimes at the expense of typing efficiency for some users.

Certain mobile devices such as cell phones, smart phones and the like, require an even smaller keyboard to maintain the form factor common with such devices. Some phones include a small key pad with physical buttons to distinguish each key on the keyboard, with which a user may use her thumbs to actuate the buttons. Other devices use a touch screen that displays a similar sized keyboard. Both of these smaller keyboards are cramped and can provide for slower and/or error prone text entry.

Although touch screen devices have become increasingly popular, consumers continue to demand simpler ways to input text, such as for e-mail, text messaging, instant messaging, and other activities. These touch screen keyboards, however, may suffer from more problems than their small key pad counterparts. The soft keys on the touch screen of such keyboards provide less tactile feedback to a user, which can lead to input errors, as well as other problems. Further, some devices have text input areas for inputting characters or letters drawn by the user, but the system must determine when one character/letter ends and the next one begins. Often, this is done with a button to commit a drawn character/letter, entry of a space character, or by a time-out or pause between inputted characters/letter. This, of course, decreases the speed of character/letter input by users.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 3A through 3D are screen shots illustrating a suitable user interface methods for character input under various implementations of the disclosed technology.

FIGS. 4A through 4F are screen shots illustrating user interface methods for user input of characters under various implementations of the disclosed technology.

FIGS. 5A through 5D are screen shots illustrating user interface methods for user input of characters under further implementations of the disclosed technology.

DETAILED DESCRIPTION

Figure 1:
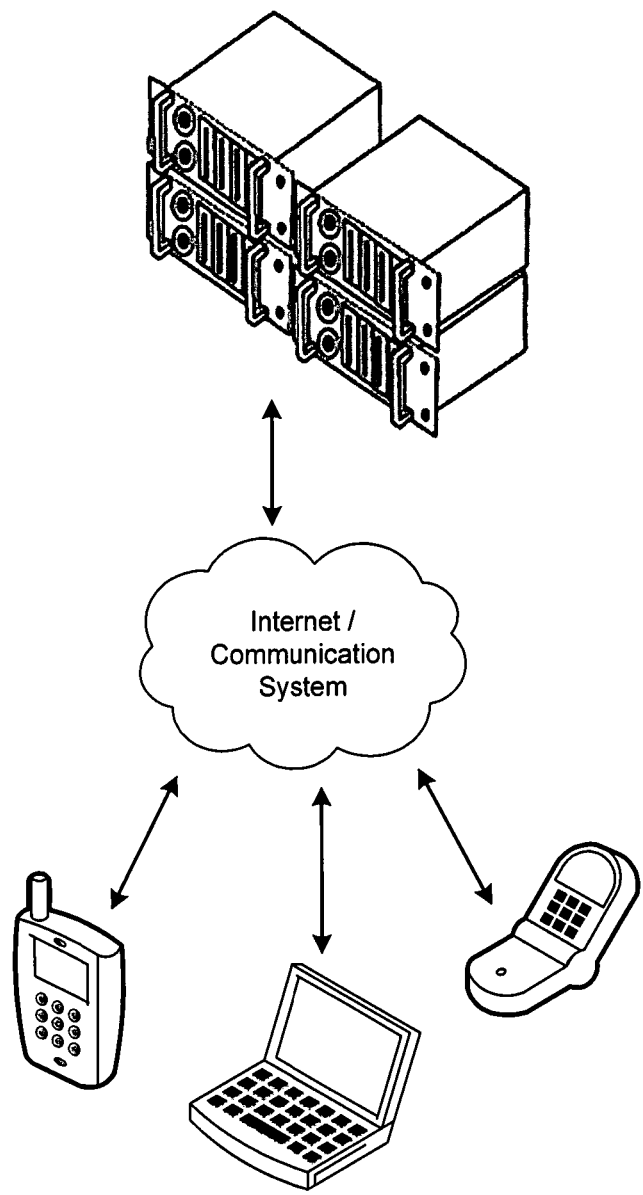
FIG. 1 shows multiple data processing devices, and a communication interface between the devices and a centralized server accessible via a network under various implementations of the disclosed technology.

Various examples of the disclosed technology will now be described. The following description provides specific details for a thorough understanding and enabling description of these examples. One skilled in the relevant art will understand, however, that the disclosed technology may be practiced without many of these details. Likewise, one skilled in the relevant art will also understand that the disclosed technology may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the disclosed technology. Indeed, certain terms may even be emphasized below; however, any terminology intended to be interpreted in any restricted manner will be overtly and specifically defined as such in this Detailed Description section.

As will be explained in further detail below, the technology described herein relates to systems and methods for increasing the speed and accuracy with which a user can enter characters or text into devices, such as into mobile devices having touch screens. In accordance with one embodiment, upon entry of a character, letter, text or similar input by the user ("character" generally), data representative of such character entry is input to a buffer and compared to linguistic knowledge before being committed.

Described in detail below is a linguistically aided auto-commit system for handwriting recognition user interfaces (UIs). The system maintains an editable or changing buffer, where the buffer stores candidate characters and/or words that may be input or selected by the user and altered by the system as new characters are added, before the candidate characters and/or words are committed to an application and the buffer is cleared of these candidate characters and/or words. The system adds characters from an input writing area and determines a best recognition result for the whole character sequence stored in the buffer. The system determines when a sequence of characters may be output to the application, from the buffer, thereby clearing the buffer and no longer allowing those characters to be selected by the user or altered by the system.

The recognition engine or process provides an indication or output as to when one or more characters can be committed and sent to the application, as opposed to requiring a user to input of a space gesture, select a commit button, or other user input. In other words, the system provides an automatic and quicker recognition system. By using more elaborate linguistic knowledge, the system can perform this identification of, e.g., the end of one word and the beginning of the next without the need to detect a space gesture between two words. The system, however, is not limited to analyzing two or more words, but can instead analyze single characters individually, but in context with other characters, such as Asian characters.

Thus, the use of linguistic tools with an intermediary buffer allows the system to use a "history" of characters input by a user to increase the speed and accuracy of handwritten characters input to the system. The system can automatically decide when to clear this intermediary buffer by analyzing the context of two or more characters or words. Many other improvements to the system are described below, such as ways to assist in identifying boundaries between words by recognizing punctuation, particular phrases, context of data entry (e.g. data being input to an address field of the form) etc.

Overall, the editable buffer is not a user interface (UI) element, but rather a buffer in the engine where the content is still modifiable (editable) by the engine. The characters in the buffer may be displayed in the UI through a recognition candidate list, (a list that contains information of a hypothesis from the engine based on the content of this buffer). It is not necessary to display the contents of this buffer in a separate UI component; however, the example described below employs a UI to show the buffer contents that the engine can modify inline in the application, typically underlined or in some other fashion highlighted or visually differentiable by a user. This will then be displayed as the current highest ranking candidate in the candidate list. The content of the buffer can then be modified in at least four different ways:

1. The user enters or writes more characters (in which case the candidate list is updated and what is displayed in the UI is likewise updated, including the highlighted part)
2. The user selects a candidate from the candidate list, such as by editing the displayed sequence (or by interacting with the highlighted area in the UI). In this case the engine will know that the user has interacted with the buffer and can therefore flush the buffer and "commit" it to the application (which will remove the highlight). The selection of the highest ranking candidate in the list could also be done with some other specialized button in the UI or a special gesture.
3. The user modifies committed text in the application which can act as context to the engine. In one example, the candidate in the engine buffer is the word "go" and the context text preceding this in the application is changed from "I can" to "I like" then the engine may find a better string candidate in the word "you" instead of "go" and that buffer may be updated accordingly without direct user interaction to place the word "you" first.
4. Auto-commit: The engine uses linguistics and or other heuristic rules to identify that part of the current content can be flushed from the engine buffer (and no longer be modifiable by the engine). For instance if the user so far has written "Iliketowrite" and the best candidate in the candidate list is "I like to write", and then the user continues writing "n" (as in the start of the word "novels"), then the engine may decide that it can "commit" "I like" to the application. The engine then notifies the UI so that before displaying the new candidate list incorporating the added "n" it sends "I like" to the application and deletes the corresponding input from the candidate list and from the highlight. Consequently the new candidate list will then contain "to write n" possibly as the best candidate and the highlighted text reflects this accordingly (whereas now unhighlighted the text "I like" has been entered before the cursor in the application).

Suitable Environment

Referring first to FIG. 1, one suitable example for employing the present system or disclosed technology is shown. In FIG. 1, one or more devices are shown, including cellular telephones, smart phones, netbooks or laptop computers or the like. Many other devices may employ the disclosed technology, such as tablet computers, ultrabooks, set top boxes, gaming consoles, hand-held gaming devices, vehicle-based computers, etc.

The disclosed technology may operate solely on such devices. However, each of these devices may be provided with a communication system, such as a standard wired or wireless Internet connection or other proprietary wireless or wired communication system, as is well known to one of ordinary skill in the art. Thus, actions taken or data entered on one or more of the devices may be communicated as appropriate to a centralized enterprise server.

Under such an alternative to the disclosed technology, certain functions that may be implemented on one or more of the user devices are instead transferred to a server, such as an enterprise server, thus providing a more similar user experience for all users of the enterprise system, as well as allowing for larger databases and data sets to be accessed, and to permit greater and quicker process than may be available on certain user devices. In particular, when entering characters into one or more of the devices, typically all functionality regarding correction and auto suggestion is performed in accordance with information retained on the device. Therefore, in accordance with this alternative, the user device may employ certain character entry and error tolerant character entry techniques at the device level, while using some error tolerant character entry results to select suggested character entry information from a centralized database location based on one or more larger databases of linguistic and usage information.

Figure 2:
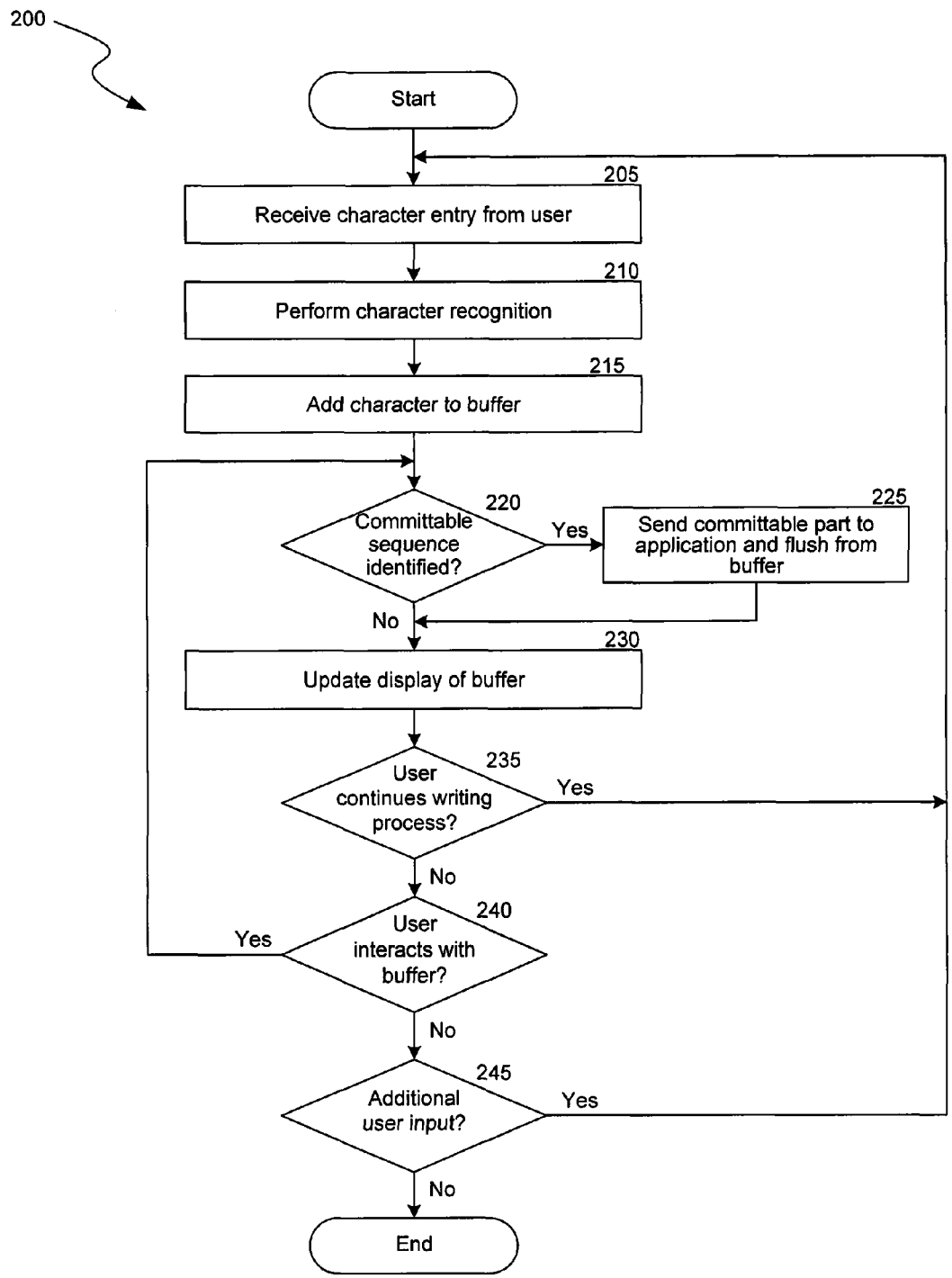
FIG. 2 is a flow diagram illustrating a process of creating a character sequence choice under various implementations of the disclosed technology.

FIG. 2 is a flow diagram illustrating a process 200 of creating a character sequence choice under various implementations of the disclosed technology. The process begins at block 205 where the user interface receives a single character input from a user. As explained in further detail below, the user can create the single character input through one or a series of strokes or input features (e.g., using a finger and/or a stylus on a touch screen interface). At block 210, the process 200 performs character recognition on the input character from block 205. Character recognition can take many forms such as, for example, comparing a best match between one or more strokes/gestures input at a touch-sensitive input device to a database of recognized characters. At block 215, after finding a best match, the process 200 adds the character to a temporary editable character buffer, which may be presented to the user.

At block 220, based on a sequence of one or more characters in the current buffer, the process 200 determines whether at least a portion of the sequence in the temporary editable character buffer is a committable sequence. Block 220 may include, for example, a recognition engine (described in further detail below) that analyzes the sequence of characters currently stored in the buffer for a match with certain rules, a database or dictionary. Based on linguistic context, for example, the process 200 may identify a character sequence of one or more characters that are meant to be separate from other characters that have been input by the user (e.g. representing two or more words). If the sequence in the buffer is identified in block 220, the process 200 proceeds to block 225 in which the committable part of the sequence is sent to the current application and removed from the buffer. (While the character sequence is described as being input to an application, it can be sent to any service, such as to a Web server for input into a web form.) As a result, a user can continually enter characters without spaces, and the system can automatically parse words from the string of input characters, as described herein.

At block 230, the process 200 updates the display of the characters (if any) currently in the buffer. If, for example, the process 200 did not identify a sequence in the buffer at block 220 (e.g. the start of the first sequence did not match any word in the dictionary), then at block 230 the unidentified sequence may be displayed to the user at block 230. If, however, part of the sequence in the buffer was identified as a committable sequence at block 220, only the remaining unidentified part of the sequence may be displayed at block 230. In addition, in some embodiments, the process 200 can present the sequence in a text area for display.

At block 235, the process 200 monitors a character input area for additional text input. If the user continues the writing process, for example, by entering one or more characters, the process 200 returns to block 205 to process the recognition of the additional text entry. If, however, no further text input is detected, the process 200 at block 240 displays one or more candidate sequences and monitors a candidate display area to receive user input indicative of a selection of one of the candidate sequences. For example, as explained in further detail herein, the process 200 may, based on the sequence currently in the buffer, display one or more candidate sequences computed by the recognition engine. (Options 1., 2. and 3. above reflect three ways a user can interact with the buffer.) If the user selects one of the candidate sequences at block 240, the process 200 returns to blocks 220 and 225 and updates the buffer accordingly at block 230. If, however, the user does not select one of the candidate sequences from the buffer display, the process 200 proceeds to block 245.

At block 245, the process 200 detects whether the system is receiving additional input from the user. If additional input is detected, the process 200 returns to block 205 to receive the additional user input. If no additional input is detected, the process 200 ends.

Suitable User Interface

FIG. 3A illustrates a user interface suitable for outputting words in response to receiving multi-modal user inputs (e.g., a mixture of stroke or traces, as well as taps, hovers, other tactile inputs and/or non-tactile inputs). The user interface described herein may form part of any system where it is desirable to convert user input into words, including, but not limited to, user devices noted above, including mobile phones, personal digital assistants, portable audio systems, laptop computers (including ultra-mobile personal computers), desktop computers, other computing systems, video game systems, televisions, and a myriad of other consumer and commercial electronic systems or appliances (including, e.g. refrigerators, kiosks, etc.)

The user interface comprises a touch screen or similar display 300 that facilitates both tactile input from a user and visual output (though separate input and output components are possible, such as a display area and a separate input area to receive character input). As indicated by the illustrative axes, each point on the display may be described by a unique X-Y coordinate. Additionally, although not shown in FIG. 3A, the user interface may receive other inputs, including inputs from a system accelerometer and/or pressure sensors in the touch screen, audio inputs, visual inputs, etc. Additionally, the user interface may produce other outputs, including other visual outputs, audio outputs, haptic outputs, etc.

The display 300 shown in FIG. 3A (and other depicted displays) is for a wireless mobile device, though of course other implementations of the technology are possible. An application bar 304 includes some information and/or input buttons for an application, which in the depicted displays is a messaging application. A text display portion or output area 306 displays text input exported from an editable buffer, which for example, may be associated with an application program.

A highest-candidate character sequence text display 307 displays text that the recognition engine has determined to be the best match or most probable candidate sequence, based on the user input, which is currently stored in the buffer. The text output in the text display 307 can be modified by the recognition engine before being committed or exported to the output area 306. As those skilled in the art would appreciate, while the candidate sequence is in the buffer, the sequence is subject to further modification by the recognition process due to, for example, additional user input. Once the candidate sequence is committed and pushed to the application, however, the recognition engine removes the sequence from the buffer, precluding further editing of the sequence.

An input area 310 of the display 300 is configured to receive tactile input from the user (e.g., by fingertip or by stylus) in the form of, for example, characters. As used herein, the term "characters" may include alphabetic letters (with or without diacritic markers such as accents), digits, characters or symbols that represent a phonetic or sub-word component, including Japanese kana, Korean jamos, and Chinese zhuyin, or another linguistic and non-linguistic characters such as digits, and punctuation that are contained in abbreviations, chat slang, emoticons, user IDs or URLs.

A key area 312 at the bottom display includes one or more function keys associated with the performance of special functions related to the input of textual information (e.g., capitalization of a letter, deletion of characters). Special function keys may include, but are not limited to, a numerical input key (e.g., to select a keyboard layout suitable for faster entry of numerical and symbolic characters), a speech recognition activation key to receive voiced input, a space key, delete key, a multi-keyboard selection key (e.g., to select a different keyboard layout and/or virtual keyboard that supports a different character set), icon input key (e.g., to select one or more icon keys), and/or a return key. The special function keys may also include, for example, a commit key which can be configured to send the currently active candidate character and/or word to the application.

FIGS. 3B-3D will now be described, which illustrate an example of tactile user input. As shown first in FIG. 3B, the input area 310 receives one or more input features that can form a first character 314 (e.g., by fingertip or by stylus). A user selection area 308 can display the contents of the recognized character buffer in a input candidate display 320 and one or more candidate words or character sequences 322. The text display 307 can display the currently selected choice in the input candidate display 320. It can also allow the user to edit the sequence shown in the text display 307 or input candidate display 320 using, for example, a virtual keyboard, additional handwriting input, and/or speech recognition. This type of action would also alter the contents of the buffer.

FIG. 3B shows a series of input features that form the first character 314 (e.g., a letter "R"). As explained in further detail below, a recognition engine can identify the character 314, based on, for example, the input features. The character 314 may then be added to the input candidate display 320, which is displayed in the selection area 308 and the text display 307 as "R." The recognition engine can also present the user with the one or more candidate character sequences 322. The recognition engine may select the candidate sequences 322 from one or more dictionaries contained therein based on, for example, user history and/or character context. For example, as shown in the FIG. 3B, based on prior character recognition, the candidate sequences 322 may include the letters "IT,"

because the user may have in the past selected "IT" when enter input features generally similar to those shown in the input area 310.

FIG. 3C shows a second series of input features that form a second character 315 (e.g., a letter "a"). The addition of the input features corresponding to character 315 in the buffer (as shown in input candidate display 320) allows the recognition engine to present more candidate sequences 322 from which the user may select the sequence 322 he or she is attempting to input. Alternatively, if the desired sequence is not one of the candidate sequences 322, the user may continue to, for example, trace and/or stroke input features into the input area 310.

FIG. 3D shows a third series of input features that form a third character 316 (e.g., a letter "t"). Based on the additional input, the recognition engine further refines the candidate sequences 322. After the user enters the third character 316, if the user's desired sequence is displayed in the selection area 308, the user can, for example, select from either the input candidate display 320 or one of the candidate sequences 322. Otherwise, the user can, for example, continue to enter an additional series of input features until the desired word is displayed in the selection area 308. The user can alternatively select the contents of the input candidate display 320 shown in the text display 307 and edit the text using, for example, one of the suitable text input methods described herein. Furthermore, the system may auto-commit the sequence shown in the text display 307 if the next recognized input does not match a known word or character sequence. For example, if a letter "x" were subsequently received by the system, the system may automatically commit "Rat" to the application because there is no known word or sequence containing the sequence "Ratx." Alternatively or additionally, the system may employ a time-out feature, so the user may wait a selected time (e.g., one second) and the system will automatically select the word in the buffer, then clear the buffer.

User Input

FIGS. 4A-4F illustrate examples of user inputs that may be received by the suitable user interface shown in FIGS. 3A-3D and analyzed by a recognition engine to produce a candidate character list that is displayed within the user interface (as in, for example, FIG. 2). For simplicity, tactile user inputs to a touch screen display are described herein in conjunction with a user's depressing the display with a fingertip. However, one having skill in the art will appreciate that the user may depress a touch screen by any suitable means, e.g., a finger, a stylus, or any other suitable input tool. Furthermore, the character entry shown in FIGS. 4A-4F contains characters from the Roman alphabet. However, the user interface can receive user character input in any number of languages, including, for example, Japanese, Chinese, and/or Korean.

FIG. 4A illustrates the user interface 300 after the user has input characters 414 (e.g., an "A" and a "B") as a part of a new character sequence. The input characters 414 are received by the recognition engine, which produces a character sequence choice list in the selection area 308. The default choice is displayed as a first sequence choice and is added to the input candidate display 320 and is presented to the user as a character sequence 432 in the text display 307. In the present implementation of the disclosed technology, the sequence 432 is underlined to indicate editability (i.e., the sequence 432 remains in the input candidate display 320 and is editable by the recognition engine and possibly also by the user). However, in other implementations, any suitable text markup (i.e. bold, italics, etc.) may be used to indicated editability of the text in the text display 307. After inputting the input characters 414, the user may proceed in one of several ways, including continuing to input additional characters, selecting a desired sequence choice from one of the options presented in the selection area 308, or directly editing the character sequence 432 in the text display 307.

FIG. 4B illustrates the user interface after the user has input an additional character 415 (e.g., a "c"). The corresponding input data is added to the buffer and the recognition engine produces a new list of character sequence candidates shown in the selection area 308 and the new sequence 434 (being the first sequence from the recognition engine) is displayed in the text display 307 and as a default choice in the input candidate display 320.

FIG. 4C illustrates the user interface after the user has input an additional character 416 (e.g., a "D"). The corresponding input data is added to the buffer and the recognition engine produces a new list of character sequence candidates shown in the selection area 308 and the new sequence 436 (being the first sequence from the recognition engine) is displayed in the text display 307 and as a default choice in the input candidate display 320. Recognition engine Based on the additional input data representing character 416, the recognition engine is able to determine that the previous character 415 should actually be an uppercase "C" rather than a lowercase "c" as previously recognized, recognition engine FIG. 4D illustrates the user interface after the user has input an additional character 417 (e.g., an "e"). The corresponding input data is added to the buffer and the recognition engine produces a new list of character sequence candidates shown in the selection area 308 and the new sequence 438 (being the first sequence from the recognition engine) is displayed in the text display 307 and as a default choice in the input candidate display 320, recognition engine. As explained above, after inputting the input character 417, the user may continue in one of several ways, including continuing to input additional characters, selecting a desired sequence choice from one of the options presented in the selection area 308, or directly editing the character sequence 438 in the text display 307.

FIG. 4E illustrates the user interface after the user has input an additional character 418 (e.g., an "F"). The corresponding input data is added to the buffer and the recognition engine produces a new list of character sequence candidates shown in the selection area 308 and the new sequence 440 (being the first sequence from the recognition engine) is displayed in the text display 307 and as a default choice in the input candidate display 320, recognition engine. Based on the additional character 418, the recognition engine is able to determine that the previous character 417 should actually be an uppercase "E" rather than a lowercase "e" as previously recognized, recognition engine FIG. 4F illustrates the user interface after the user has input an additional character 419 (e.g., a "G"). The corresponding input data is added to the buffer and the recognition engine produces a new list of character sequence candidates shown in the selection area 308 and the new sequence 444 (being the first sequence from the recognition engine) is displayed in the text display 307 and as a default choice in the input candidate display 320, recognition engine. At this point, the recognition engine has realized that the user has had several iterations to edit the first characters 414 and determines that that the characters 414 form a recognized sequence 442 that the user is unlikely to edit. As a result, the recognition engine removes the recognized sequence 442 from the buffer, thereby precluding the recognized sequence 442 from further alteration by the recognition engine. The sequences 442 is removed from the text display and sent to the application and 444 is displayed in the text display 307. In this way, the recognition engine is able to receive single character input and recognize character sequences without the need of a designated segmentation character (e.g., a space). This offers an advantage of, for example, increased speed of input and acceptance of input using character input in alphabets that typically do not use a space between characters (e.g., Japanese, Chinese, and/or Korean alphabets).

FIGS. 5A-5D illustrate examples of user inputs that may be received by the suitable user interface shown in FIGS. 3A-3D, using characters from the Chinese alphabet. As noted above, however, the user interface can receive user character input in any number of other languages, including, for example, Japanese and/or Korean.

FIG. 5A illustrates a user interface 500 after the user has input a first character 514 (e.g., a Chinese 嗨 character) as a part of a new character sequence. The input data corresponding to character 514 is received by the recognition engine, which produces a character sequence candidatelist in the selection area 308. The default choice is displayed as a first sequence choice, is added to the buffer, and is presented to the user as a character sequence 532 in the input candidate display 320 and the text display 307. After inputting the first character 514, the user may proceed in one of several ways, including, for example, continuing to input additional handwritten characters or directly editing the character sequence 532 in the text display 307.

FIGS. 5B-5C illustrate the user interface after the user has input second and third characters 515 and 516 (e.g., Chinese 你 and 好 characters, respectively). The corresponding input data is added to the buffer and the recognition engine produces a new list of character sequence candidates shown in the selection area 308 and the updated sequence 532 (being the first sequence from the recognition engine) is displayed in the text display 307 and as a default choice in the input candidate display 320, recognition engine. As was the case in FIG. 5A described above, after inputting the characters 515 and 516, the user may proceed in one of several ways, including, for example, continuing to input additional characters, selecting a desired sequence choice from one of the options presented in the selection area 308, or directly editing the character sequence 532 in the text display 307.

FIG. 5D illustrates the user interface 500 after the user has input a fourth character 517 (e.g., a Chinese 嗎 character). As described herein, the recognition engine can be configured to determine whether the user intends to make edits to the currently selected sequence shown in the text display 307 and as the first candidate in the input candidate display 320 based on, for example, linguistic and contextual cues and/or the amount of time since the user inputted the character without being edited. For example, the recognition engine can employ a linguistic engine to disambiguate or separate the character sequence into two or more recognized sequences. The recognition engine can also determine that user is unlikely to edit one of the recognized sequences and accordingly push the sequence to the current application, based on, for example, the amount of time since the user has inputted the sequence and/or past user input history.

As shown in FIG. 5D, the linguistic engine of the recognition engine determines that user intended to input a first recognized sequence 534 comprising the first character 514 (e.g., 嗨 or "Hi." in Chinese), and a second recognized sequence 536 comprising the characters 515-517 (e.g., 你 你好嗎 or "How are you" in Chinese). The recognition engine also determines that the user is unlikely to edit the sequence 534 since he or she has subsequently entered the characters 515-517 without editing the first character 514. Accordingly, the sequence 534 is removed from the buffer and pushed to the application displayed in the user interface 500, precluding the recognition engine from further alteration of the sequence 534. As noted above, automatically removing, for example, the sequence 534 from the buffer offers the advantage of increased speed of input and acceptance of input using character input in alphabets that typically do not use a space between characters (e.g., Chinese, Japanese, and/or Korean alphabets). The sequence 536 remains in the buffer and is presented as the default option in the selection area 308, while an additional sequence (e.g., 你好嗎? or "How are you?" in Chinese) is presented as another option based on context and linguistic cues. Moreover, the present system provides improved speed since a user need not purposefully pause between each inputted character, or select a commit button; instead, the user can continue to enter characters, one on top of the other, in the text entry location.

The system may employ other disambiguation and automatic correction techniques to further aid in user input, such as is described in detail in commonly assigned U.S. Pat. No. 6,307,549, entitled "REDUCED KEYBOARD DISAMBIGUATION SYSTEM;" U.S. patent application Ser. No. 11/379,006/U.S. Patent Publication No. 2006/0274051 entitled "VIRTUAL KEYBOARD SYSTEMS WITH AUTOMATIC CORRECTION," filed Apr. 17, 2006; U.S. patent application Ser. No. 11/379,006, entitled "DISAMBIGUATION OF ICONS AND OTHER MEDIA IN TEXT-BASED APPLICATIONS," filed Mar. 29, 2007, and 61/313,564, filed Mar. 12, 2010; U.S. patent application Ser. No. 12/498,338/U.S. Patent Publication No. 2010/0121870 entitled "METHODS AND SYSTEMS FOR PROCESSING COMPLEX LANGUAGE TEXT, SUCH AS JAPANESE TEXT, ON A MOBILE DEVICE," filed Jul. 6, 2009; and International Patent Application No. PCT/US2011/28387/International Patent Publication No. WO2011/113057, entitled, "MULTIMODAL TEXT INPUT SYSTEM, SUCH AS FOR USE WITH TOUCH SCREENS ON MOBILE PHONES," filed Mar. 14, 2011, all of which are incorporated by reference.

Suitable System and Disambiguation/Recognition

Figure 6:
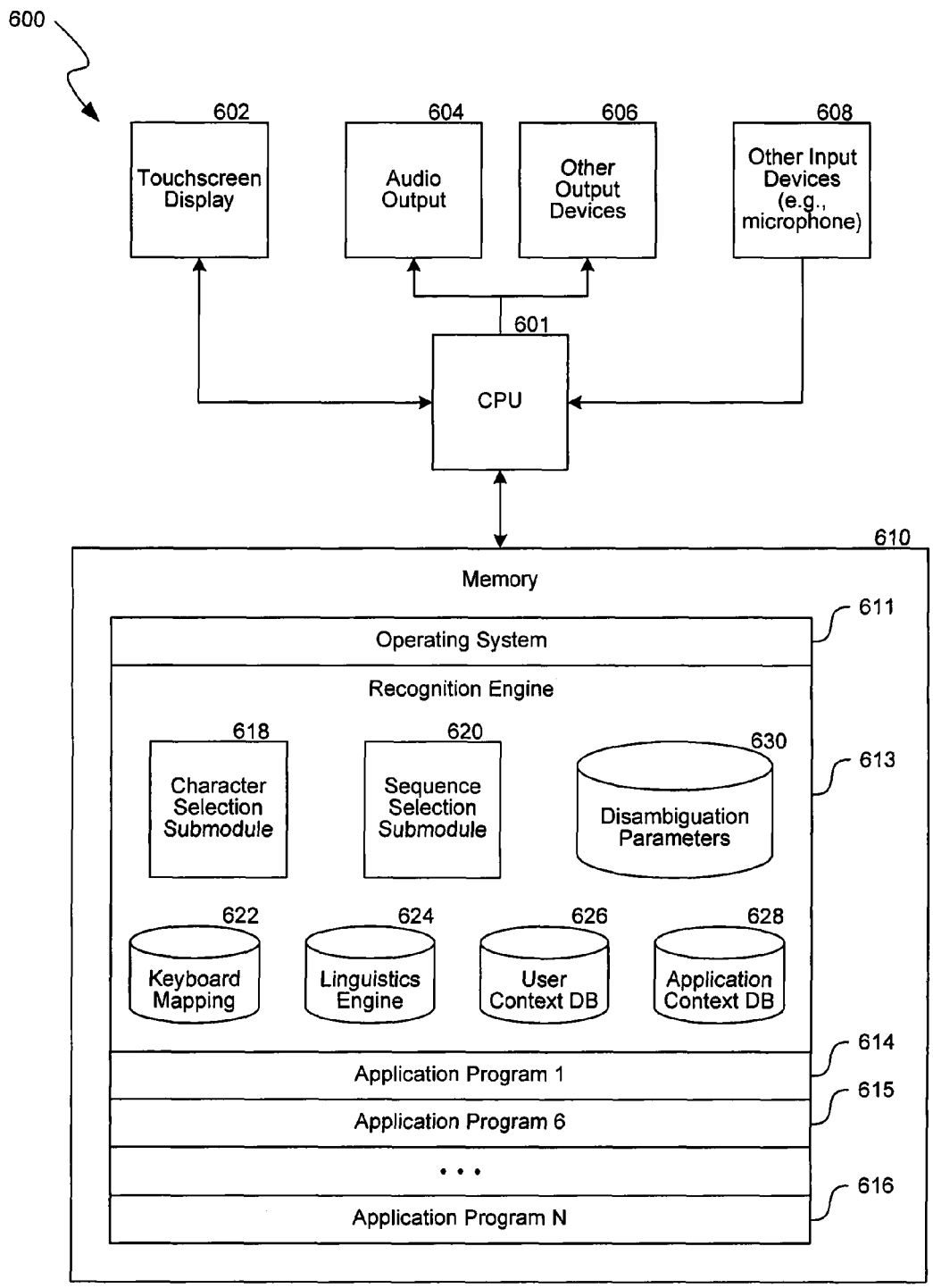
FIG. 6 is a block diagram illustrating a suitable computing system that may employ aspects of the disclosed technology.

FIG. 6 and the following discussion provide a brief, general description of a suitable computing environment in which the disclosed technology can be implemented. Although not required, aspects of the disclosed technology are described in the general context of computer-executable instructions, such as routines executed by a general-purpose data processing device, e.g., a server computer, wireless device or personal computer. Those skilled in the relevant art will appreciate that aspects of the disclosed technology can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the disclosed technology can be embodied in a special purpose computer or data processor that is specifically programmed, configured, or constructed to perform one or more of the computer-executable instructions explained in detail herein. While aspects of the disclosed technology, such as certain functions, are described as being performed exclusively on a single device, the disclosed technology can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

In one embodiment, the disclosed technology is implemented as a sequence of program instructions that are stored in a non-transitory computer readable media or computer readable memory. The instructions are executed by processor electronics to perform the functions described herein. Aspects of the disclosed technology may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the disclosed technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 6 illustrates a suitable data processing or computing system 600 in which a recognition engine 613 may operate in order to provide the user interface functionality described herein. The computing system may include a touch screen display 603, other input devices 608, an audio output component 604, other output devices 606, one or more processors or central processing unit (CPU) 601, and at least one memory 610, some or all of which may be carried or housed within a housing (not shown). As an alternative, or in addition to the CPU, the computing system 600 may include one or more digital signal processors (DSPs), application-specific integrated circuits (ASICs), field programmable gate arrays (FPGAs), or other logic/data processing circuitry.

The input and output components may include a global positioning system (GPS), a digital camera, a wireless LAN (WiFi) interface, a motion sensor, accelerometer, a Bluetooth® interface, an external USB or similar port, a headphone or headset jack adapter, projection display, haptic output device (e.g., a vibrator), as well as other components or a communication elements. For example, the Bluetooth® interface may communicate with an external wireless communications component, such as a wireless headset, to not only receive audio input but also provide audio output. In one implementation, the computing system 600 is a mobile phone, whereby the system also includes one or more radios coupled to the CPU 601 to permit wireless communications.

The output modalities of the system may include text-to-speech, audio, vibration, tactile, visual, etc. outputs. For instance the system can let the user know which input features, characters and/or letters have been recognized by adding a 'vibrate' or 'sound' feedback. Similarly, the system can provide the user with more detailed understanding of the features extracted and the level of uncertainty involved in its determinations.

The memory 610 may further comprise an operating system 611, a recognition engine 613, and one or more application programs (shown as application programs 1 through N 614-616). As described below, the recognition engine 613 can perform not only the character sequence process 200, but can also perform disambiguation and other recognition functions. The application programs can include word processing programs, slide presentation or image creation programs, email programs, SMS/MMS messaging programs, instant messaging programs, or other text-based communication or text-based document creation programs.

The recognition engine 613 receives user input data from the operating system, including data related to a users input with the touch screen 603, and uses the received input data to identify a committed character sequence (e.g., one or more words), which it may provide to an application program. For example, the recognition engine 613 may receive a series of notifications from the operating system 611 of finger down events (when a user depresses a point on the touch screen), finger move events (e.g., when a user moves his finger while depressing the screen), and finger up events (e.g., when a user lifts their finger from the touch screen). (While generally described herein as using a finger, the user may use anything to touch or actuate the touch screen, such as a stylus.) Each of the received notifications may include a time series of position data, e.g., an X-Y set of coordinates (x, y) with a timestamp t (i.e., the coordinates (x, y, t)), which reflect the user's tactile input to the touch screen 603. Additionally, if the touch screen 603 comprises pressure sensors, the received notifications may include a time series of position and pressure data, e.g., a set of coordinates (x, y, t, p) that reflect the user's tactile input to the touch screen 603, including the applied pressure, p. The operation system 611 may also provide other kinds of input data to the recognition engine 613, including multi-touch inputs (e.g., additional sets of simultaneous coordinates (x, y, t) representing a second finger simultaneously contacting the touch screen), audio inputs (e.g., voice inputs), visual inputs, accelerometer inputs, location data, sensor data, etc.

The recognition engine may additionally access or receive and process, dynamic context information from the operating system and/or application program(s) in order to facilitate its identification. Context information is any information that may help inform the recognition engine of the user's intent, and may include information such as sentence or word-pair context, language context, application-specific context (e.g. data fields/tags), user-specific context, location, time of day etc., as described in greater detail herein. For example, the module may receive context information such as the last word selected by the user, other sentence-level context, the virtual keyboard layout utilized, the type of entry field into which the word will be entered (e.g., a "Contacts" field), location data (e.g. where the computing system includes a GPS receiver or accesses location data), calendaring data for the user, and/or context data or applications used or being used that may utilize the identified word. As another example, the recognition engine may receive a probabilistic "N-best" list from another mode of input. An N-best list is a rank-ordered list of suggested words, which may be capped at a fixed size (e.g., N). As one example, an N-best list may be generated from another type of disambiguation application program or module, such as a list of words generated from a speech recognition program (e.g., a list of homophones) or a handwriting-recognition program. As still another example, if a user is entering text in order to respond to an earlier email, the recognition engine may receive a list of words used in the earlier email.

The recognition engine may include a character selection submodule 618, a sequence list selection submodule 620, a keyboard mapping database 622, a vocabulary module 624, a user context database 626, an application context database 628 and a disambiguation parameter database 630. While depicted as separate modules, a single module, program or routine may incorporate two or more of the modules. While not shown in FIG. 6, the recognition engine includes the buffer, as noted noted above.

The character selection submodule 618 is configured to analyze received user input or input data to extract input features (or "input features"), e.g., strokes, taps, corners, segments, and/or other features. The character selection submodule 618 is further configured to analyze the extracted input features using a language-independent database 622 to produce an input sequence that comprises an ordered set of feature objects (e.g. rank ordered set of letters for a word being spelled) and may generate the best match character. Each feature object in the input sequence may be associated with a character associated with one or more input feature sequences. During its operation the character selection submodule may utilize parameters, policies, and preferences retrieved from the disambiguation parameter database. Further details on aspects of the character selection submodule 618 may be found, for example, in the assignee's U.S. Pat. No. 7,177,473 entitled, "HANDWRITING DATA INPUT DEVICE WITH MULTIPLE CHARACTER SETS," and incorporated by reference herein.

The sequence list selection submodule 620 is configured to receive the input sequence of characters generated by the character selection submodule. The sequence list selection submodule 620 may analyze the input sequence using a variety of other inputs in order to generate a rank-ordered or otherwise structured sequence choice list, such as those shown in FIGS. 4A-4F and/or FIGS. 5A-5D. The other inputs that the sequence list selection submodule 620 may use include data from the linguistics engine 624, parameters retrieved from the disambiguation parameter database 630, received dynamic context data, and context data retrieved from the user context database 626 and the application context database 628. The sequence list selection submodule 620 is described in greater detail herein.

To facilitate sequence selection, the linguistics engine 624 provides one or more dictionaries that define a set or logical group of words. For example, an "American-English" dictionary may define a logical group of words in common usage by English-speaking Americans, while an "American-English-Msg" dictionary may define a logical groups of words (including emoticons) commonly used by English-speaking Americans in text and multimedia messages (e.g. SMS, MMS or similar messages). In some embodiments, Chinese, Japanese, and/or Korean dictionaries may also be included. The linguistics engine 624 may also provide additional language information, such as static or dynamic frequency information within a particular logical group of words (e.g., within a particular language) and/or particular context. For example, the additional language information may include frequency information in accordance with a linguistic model, which may include one or more of: frequency of occurrence of a word in formal and/or conversational written text; frequency of occurrence of a word when following certain preceding word or words; proper or common grammar of the surrounding sentences; frequency of the word being utilized as a left-stem or right-stem (or prefix or suffix), etc. In addition to frequency, transition probabilities may be assigned to particular transitions, linking one class of prefixes to likely stems or stems with one or more classes of suffixes while rejecting prefixes with other words in the dictionary which would form illegal words. For example the word "work" may have high transition probabilities with suffixes -er, -ers, -ing, -s and -ed, which often form valid words.

The disambiguation parameter database 630 may store various parameters, policies, and preferences for performing interaction or input feature extraction, character selection and/or sequence selection. For example, the disambiguation parameter database may include parameters and policies that aid the system in selecting and applying distance functions, proximity metrics, matching metrics and post-processing steps, all of which are described herein.

To facilitate improved character and/or sequence recognition and/or selection, the user context database 626 and the application context database 628 may provide context information to the character selection submodule 618 and/or the sequence list selection submodule 620 to inform its processing; these submodules may also receive dynamic context information from an application program and/or the operating system. The entry of text, the selection amongst alternatives, contextual information and multiple modalities are managed by the recognition engine. The system may use inputs from the user, the context of the application, external sensors and context resources and disambiguation, and correction approaches to determine the user's intent as noted herein. Based on an understanding of the users intent, the system maintains the context and state of the application, and manages the composition of inputs and synchronization across multiple input modalities. By interfacing with business logic, the system can produce multimodal output to be presented to the user. The interaction, the business logic and the context and state may be managed through an interaction script or more complex state machines (State Chart XML or SCXML) or languages which are used for the control of user interfaces such as XHTML+Voice Profile or SALT.

The user context database 626 may include any historical information relating to the user's prior character and/or sequence selection behavior, such as previous words utilized by the user, the frequency of words entered by the user, and common phrases employed by the user. Other examples of user context information include: word pairs entered by a user, a user's unique vocabulary in a specific application (text messaging vs. email, for example), a user's level of 'sloppiness' (increasing the character region size) while entering text into the system, etc. Additionally, user context information may reflect how frequently a user selects words from a particular language or what language the user primarily uses. For example, if the system utilizes both Chinese and English language dictionaries for a bilingual user, the user context database 626 may track the relative frequency with which the user selects Chinese words versus English words in order to determine the users "primary language," and then words from that dictionary may be preferred or presented first over words from the other dictionary.

Alternatively or additionally, some user context information may be reflected in a user-specific dictionary and/or other data structures in the linguistics engine 624. Additionally or alternatively, the user context database 626 may also provide user-specific policies and parameters that may override default disambiguation parameters stored in the disambiguation parameters database 230.

The application context database 628 may permit the recognition engine 613 to access historical information related to character or sequence selection within a particular application program. The application context database 628 may also provide application-specific dictionaries and/or application-specific policies and parameters that may override default disambiguation parameters stored in the disambiguation parameters database 630. Context can also come from text fields in which the information is supposed to be entered. As an example, in some implementations, the recognition engine may be designed to integrate with specific types of application programs that define application-specific fields, tags or labels that may be associated with a particular word entry. The text-field of a form ("Name" or "Email") may be a label that could be utilized to provide context information. The application context database 628 may then correlate a user's historical word entries with application-specific field(s) to provide additional context information. The system may define, in the application context database, application-specific fields and rules (e.g., grammar rules, matching metrics and/or post-processing rules) that reflect how the field information and other context information may be utilized during word selection. These rules may even specify that word suggestions for a particular field can depend on what words a user has entered in other fields.

The system informs the recognition engine of the intended textual information of the field (name, phone number, date, email address, password) and/or provides it with a grammar which describes the information. For instance a form which requires State, ZIP and City to be entered would use an approach that would be able to provide appropriate grammars based on the context and content of the other fields. If the State is "WA", the grammar for cities is constrained by actual cities in the State of Washington and ZIP codes are similarly constrained. When City and State are entered, the range of ZIP codes is again constrained. Complex interactions between fields and grammars can simplify the entry of data in such "forms". Alternatively, the system can learn the context for often used text fields.

To illustrate the use of this context information, consider the example of form filling, where the recognition engine may remember what words users have entered in particular field(s). In this example, in an order form a user may enter his work email into an email field and then the recognition engine would predict that the shipping address field would contain his work address. In contrast, if he enters his personal email address into an email field, the recognition engine would predict his home address in the shipping address field.

Other contextual information includes environmental parameters, such as time of day, location, calendar entries, user settings, application settings and system settings.

While shown as separate databases, two or more of the databases described herein may be combined, and may be implemented in any data structure or logical construct.

The character selection submodule 618 and/or the sequence list selection submodule 620 may keep the user context database 626 and/or the application context database 228 current by providing notifications about a user's present behavior. For example, the sequence list selection submodule 620 may return information to these databases when a user selects a sequence from a sequence selection list.

Additionally, as described previously, the recognition engine 613 may also receive additional dynamic context data from the operating system and/or an application program. Although not shown, the recognition engine may additionally comprise voice recognition software configured to disambiguate speech or audio inputs, as described herein.

Suitable Disambiguation Methods

The flow diagrams described herein do not show all functions or exchanges of data, but instead provide an understanding of commands and data exchanged under the system. Those skilled in the relevant art will recognize that some functions or exchange of commands and data may be repeated, varied, omitted, or supplemented, and other (less important) aspects not shown may be readily implemented. Further, although process steps, method steps, blocks, algorithms or the like may be described in a particular order, such processes, methods, blocks and algorithms may be configured to work in alternate orders. In other words, any sequence or order described herein does not necessarily indicate a requirement that the steps or blocks be performed in that order. The steps or blocks of processes and methods described herein may be performed in any order practical, and some steps may be performed simultaneously.

Figure 7A:
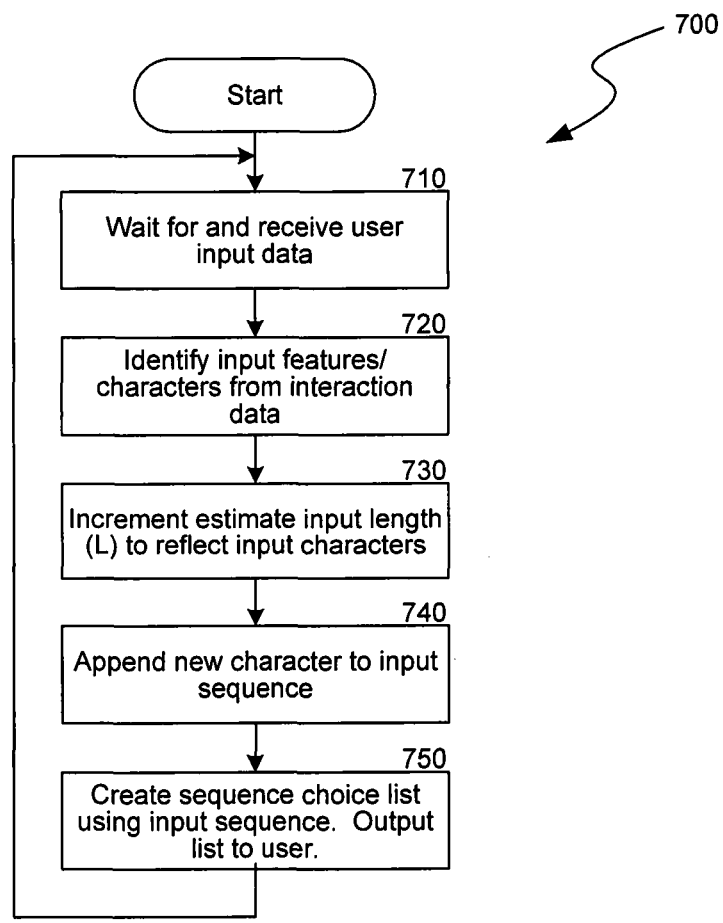
FIG. 7A is a flowchart illustrating a process for creating a word choice list based on user input to a device under various implementations of the disclosed technology.

FIG. 7A shows a process 700 for disambiguating a series of user input data that may correspond to multi-modal user input in order to permit the selection of a sequence from a sequence choice list. The process 700 is performed by the recognition engine 613 and begins at block 710, when the recognition engine 613 waits for and receives input data before proceeding to block 730. Typically, the recognition engine 613 receives input data in the form of one or more user input notifications or input events from the operating system, but it may also receive input data from other processes, such as an application program. For example, at block 710 the recognition engine may wait for and receive from the operating system a finger down notification, a finger move notification, and/or a finger up notification, each of which is accompanied by a set of (x, y, t) or (x, y, t, p) coordinates, where x is the x-position of a user's finger on the display, y is the y-position of the user's finger, t is the time or a clock reference for those inputs, and p is an optional pressure measurement (for a pressure sensitive screen). The recognition engine 613 may also wait for other forms of input data, such as voice inputs, accelerometer input, external sensor data, location information. Although not shown, at block 710, the recognition engine 613 may receive additional dynamic context data, e.g., from the operating system and/or an application program. For example, it may receive information about the type of application program or the context in which the user is entering text (e.g., the type of field in which the user is typing, e.g., a date field versus a name field).

The period of time that the recognition engine waits for and receives user input data may vary. For example, in one implementation, the recognition engine may wait to receive an entire group of notifications corresponding to (1) a finger down notification, (2) the next finger up notification, and (3) all of the finger move notifications that occur in between these first two notifications, before proceeding to block 730.

At block 740, the recognition engine utilizes the character selection submodule 618 to identify what input features (e.g., strokes, taps, corners, segments, hovers, audio inputs, etc.), if any, are indicated by the received input data. Furthermore, at block 740, the recognition engine utilizes the character selection submodule to generate a feature object for each identified input feature. A feature object includes a character, and may include other information, such as a feature type (or set of types), and a proximity weight (or weight set). Under block 740, the system stores an inputted character in the buffer.

During block 740, the character selection submodule may also characterize each identified input feature using one or more feature types. For example, the character selection submodule may characterize each input feature as a tap, a corner, a segment, a hover, etc. Additionally, the character selection submodule may also determine whether an identified input feature is an "intentional input feature" (or "intentional feature"). An intentional input feature is an input feature that appears more likely to correspond to an intended stroke by a user as compared to other types of input features. If a feature is not an intentional input feature, it is instead characterized as an "incidental input feature" (or "incidental feature"). When matching candidate sequences to input features, intentional input features may be treated differently (e.g. weighted higher) than incidental features, as described herein.

At block 750, the recognition engine may increment an estimated input length variable (L) to reflect the number of characters or new intentional input features, if any, that were identified at block 740. As described herein, the recognition engine may later use the estimated input length L to pre-filter dictionaries or for other purposes when generating a sequence choice list. Similarly, at block 750 the recognition engine may additionally update other variables that reflect the composition of the input sequence (e.g., a variable that reflects the number of segment features present in the input sequence).

At block 750, the recognition engine appends any newly generated characters to an input sequence, which is stored in the buffer. The characters in the input sequence are ordered on the basis of time.

Figure 7B:
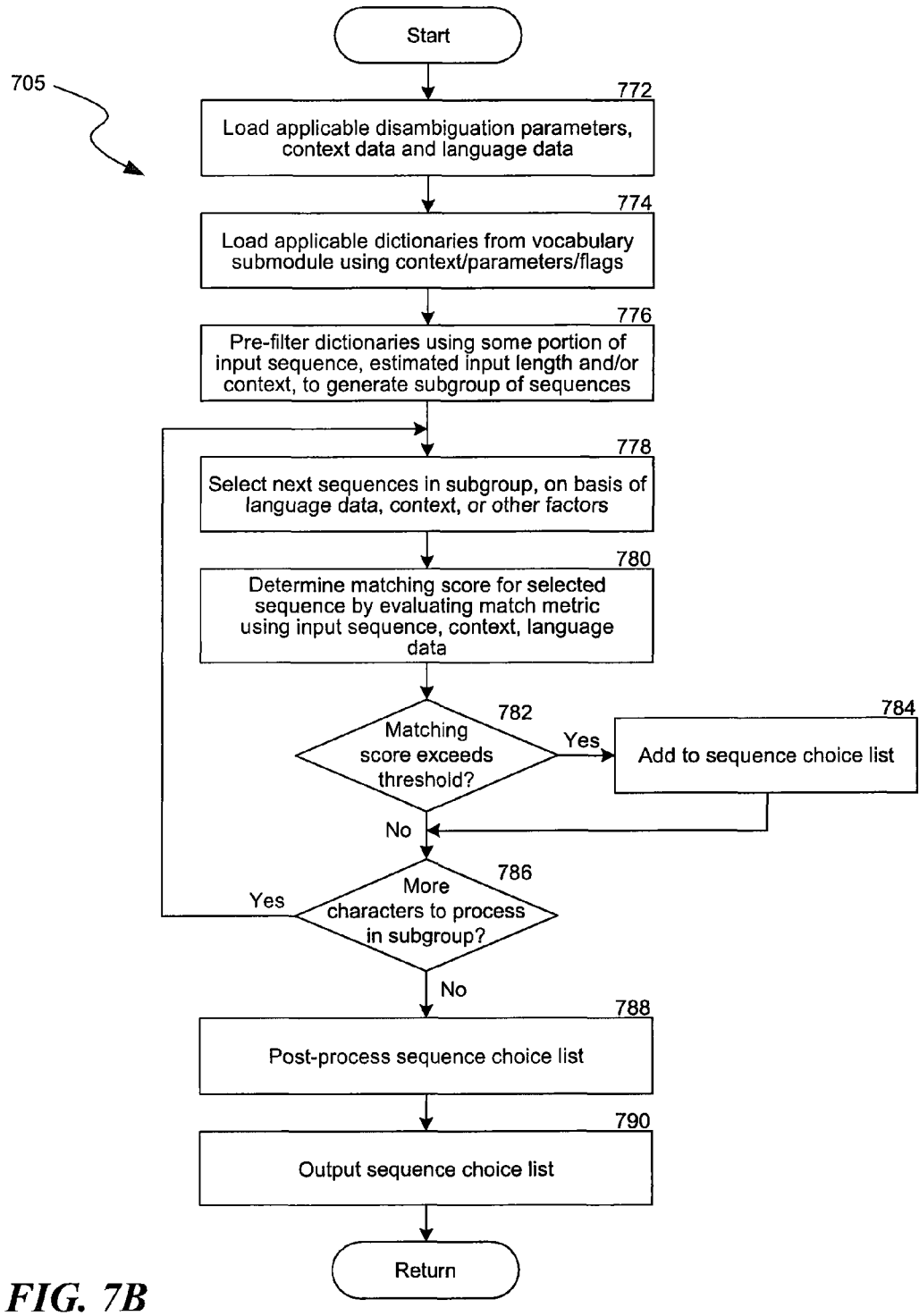
FIG. 7B is a flow diagram illustrating a process to generate a word choice list under various implementations of the disclosed technology.

FIG. 7B shows a process 705 for creating a character sequence choice list using an input sequence of characters. The process 705 begins at block 772, where the character sequence list selection submodule loads, receives or accesses applicable disambiguation parameters; context data, including semi-static context data retrieved from the user context database and application context database and dynamic context data received from an operating system and/or application program; and language data, including, e.g., frequency data from a vocabulary module, user context database, and/or application context database. At block 774, the character sequence list selection submodule ("sequence submodule" for short) loads applicable dictionaries from the vocabulary submodule using the context data, disambiguation parameters, and/or any flags (e.g., language selection flags). For example, the dictionaries used may be selected on the basis of the type of application program that will receive the output of the recognition engine. As another example, the dictionary used may be generated by analyzing the user's speech using voice recognition software or by analyzing another mode of user input. For example, the dictionary may be an N-best list generated by voice recognition software, handwriting recognition software, etc.

At block 776, the sequence submodule may pre-filter the dictionaries using some portion of the input character sequence, the estimated input length L and/or the context to generate a subgroup of sequences. As a first example, the sequence submodule may pre-filter the dictionary on the basis of estimated input length L. For example, the sequence submodule may filter out any character sequences that are shorter than L minus X, where X is determined using disambiguation parameters. As a second example, the sequence submodule may pre-filter the dictionary to a list of character sequences generated by voice recognition software. As a third example, if the dynamic context indicates that the user is typing in a name field, it may filter the dictionary to only include proper nouns. Of course, the sequence submodule may use a combination of these filtering techniques.

At block 778, the sequence submodule selects the next character sequence in the subgroup on the basis of language data, context, sequence length, and/or any other suitable factors. For example, the sequence submodule may sort the subgroup on the basis of frequency of use and present these character sequences in that order.

At block 780, the sequence submodule determines the matching score for the selected character sequence by evaluating a match metric using input sequence, context, sequence length, and language data. At decision block 782, the sequence submodule may determine if the sequence has a matching score that exceeds a minimum threshold value that is determined using disambiguation parameters. If it does, the character sequence is added to the sequence choice list at block 784 before the process proceeds to block 786. Otherwise processing proceeds directly to block 786. The sequence submodule may eliminate poorly matching character sequences and provide a sequence list of fixed or minimum size. Alternatively block 782 may be eliminated from the sequence submodule.

At block 786, the sequence submodule determines if there are more sequences to process in the subgroup. If there are, the processing returns to block 778 so that another character sequence may be evaluated.

Otherwise, the process proceeds to block 788, where the sequence choice list is post-processed. For example, the sequence submodule may sort the list by matching score and/or by selecting one or more default character sequences that have the highest matching score. As another example, after sorting, the sequence submodule may group or adjust the ordering of sequences in a logical fashion to facilitate improved user browsing behavior. For example, the sequence submodule may rearrange the list to group together words that have the same root (e.g., "interest," "interesting," and "interestingly") to permit a user to scan the sequence choice list more rapidly. As yet another example, dynamic or static context data may be utilized at block 790 to adjust the list, e.g., to promote or demote particular words in the list and/or to otherwise adjust the order of the list. For example, if a user has utilized a particular word in the same application program before, that word may be promoted. As another example, the word submodule may promote words that end with a punctuation mark over words that have embedded punctuation marks. As yet another example, if more than one language dictionary was utilized to generate a word list or the recognition engine is otherwise providing bilingual integration (e.g., to accommodate a bilingual user), the post-processing may promote words in the primary language of the user and/or demote words in a secondary language of the user. The "primary language" of the user may be determined by language parameters or flags and/or by user context data from the user context database 626.

As still another example of post-processing, the recognition engine may promote or demote particular words based on application-specific field information and/or rules or grammar retrieved from the application context database.

In another example of post-processing, the recognition engine may determine whether the user is attempting to utilize a word that may not be listed or found in a standard dictionary, such as neologism like "podcast," or an uncommon proper noun. If it determines, based on typical character sequences in a language that the user may be attempting to enter an "unlisted" word that does not appear in the dictionary, it will make the unlisted word the default word, and provide the word choice list as an alternative suggestion. Otherwise, it may utilize a high-scoring word selected from the dictionary as the default word.

To illustrate, if the user crisply inputs the letters "podcast," the recognition engine may keep "podcast" as default word, despite the fact that it may not be in a standard English dictionary, since the character sequences (the combinations of "po," "ca," and "st," etc.) are frequently seen in the English language. On the other hand, if the user crisply taps out the letters "Pfsx," the recognition engine may assume that the user has made a misspelling (or traced sloppily with a finger or fingers) and will not select "pfsx" as the default word, since the combinations of "pf" "fs" and "sx" are all infrequently seen in the English language. Instead the recognition engine will select a dictionary word with a high matching score found during blocks 772-786.

At block 790 the sequence choice list is output to the user, e.g., via a sequence choice list area on a display or otherwise. Alternatively, the sequence choice list and/or a default sequence may be provided to another process (e.g., an application program) that does not need user intervention to select a word.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the disclosed technology provided herein can be applied to other systems, not necessarily the system described above. The elements and acts of the various examples described above can be combined to provide further implementations of the disclosed technology. Some alternative implementations of the disclosed technology may include not only additional elements to those implementations noted above, but also may include fewer elements.

Any patents and applications and other references noted above, including any that may be listed in accompanying filing papers, are incorporated herein by reference. Aspects of the disclosed technology can be modified, if necessary, to employ the systems, functions, and concepts of the various references described above to provide yet further implementations of the disclosed technology.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system may vary considerably in its specific implementation, while still being encompassed by the disclosed technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

We claim:

1. A method for data input on a touchscreen of a mobile device, the method comprising:
    receiving a first user input,
        wherein the first user input is handwritten input received on the touchscreen of the mobile device;
    determining a first recognized sequence based on the first user input;
        wherein the first recognized sequence is a best match of the first user input;
    writing the first recognized sequence to a memory storage buffer of the mobile device;
    generating a first candidate sequence,
        wherein the first candidate sequence is a best match of one or more recognized sequences;
    presenting the first candidate sequence to the user,
        wherein the presenting includes displaying the first candidate sequence to the user and allowing the user to edit the first candidate sequence;
    identifying at least a first sequence portion of the first candidate sequence
        wherein the identifying is at least partially based on one or more rules or dictionaries of words accessible to the mobile device;
    removing the first sequence portion from the memory storage buffer,
        wherein the removing is performed in the absence of receiving user input editing the first candidate sequence, representing a space character, or selecting a word; and
    sending the first sequence portion to an application running on the mobile device.

2. The method of claim 1, further comprising:
    receiving at least a second user input;
    determining a second recognized sequence based on the second user input; and
    revising the first candidate sequence, wherein the revised first candidate sequence is based on the first recognized sequence and the second recognized sequence.

3. The method of claim 1, further comprising:
    determining at least a second candidate sequence based on the first user input; and
    presenting at least the second candidate sequence to the user.

4. The method of claim 1 wherein the identifying is based on linguistic properties of the first user input and the first candidate sequence, and a probability of future editing of the first sequence portion by the user.

5. The method of claim 4, wherein the removing is performed when the probability is less than a predetermined amount.

6. The method of claim 1, wherein the first sequence portion is removed from the memory storage buffer a predetermined time after second user input is received.

7. The method of claim 1, wherein the dictionaries of words include words in Chinese, Japanese, or Korean languages.

8. The method of claim 1, wherein the first user input includes at least one of a Chinese character, a Japanese character, or a Korean character.

9. At least one non-transitory computer-readable storage medium storing instructions for data input, wherein the data input is performed at a wireless device having a processor and a memory, comprising:
- receiving a first user input and at least a second user input;
  - wherein the first and second user input are handwritten input received on a handwriting input area of the wireless device;
- determining a first sequence based on a best match of the first and second user inputs,
  - wherein the first sequence includes at least the first input;
- storing the first sequence to a memory of the mobile device;
  - automatically determining that at least a portion of the sequence matches a word or phrase in a database of acceptable words and/or phrases without the user inputting a space or selecting a word; and
- sending the first sequence to an application or service running on, or accessible by, the wireless device,
  - wherein the sending comprises removing the first sequence from the memory storage buffer, and
  - wherein the sending is performed in the absence of user editing of the first sequence.

10. The computer readable medium of claim 9, further comprising:
- determining at least a second sequence based on the first user input and the second user input;
- presenting the second sequence to the user.

11. The computer readable medium of claim 9, wherein the first sequence is sent to the application or service a predetermined time after the first user input is received in the absence of user editing of the first sequence.

12. The computer readable medium of claim 9, further comprising:
- presenting the first sequence to the user,
  - wherein the presenting includes displaying the first sequence to the user and allowing the user to edit the first sequence.

13. The computer readable medium of claim 9, wherein the first user input and the second user input include at least one of a Chinese character, a Japanese character, or a Korean character.

14. A data processing apparatus, comprising:
- at least one processor;
- at least one memory coupled to the processor;
- data input and data output components coupled to the processor,
  - wherein the data output component includes a visual display device; and
  - wherein the data input component includes at least an area for receiving hand written character input;
- wherein the data processing apparatus is configured to:
  - receive first character data representing a first handwritten character input to the data input component;
  - determine a likely first displayable character associated with the first character data;
  - store the likely first character data in the memory;
  - receive second character data representing a second handwritten character input to the data input component;
  - determine a likely second displayable character associated with the second character data;
  - store the likely second character data in the memory;
  - receive third character data representing a third handwritten character input to the data input component;
  - determine a likely third displayable character associated with the third character data;
  - store the likely third character data in the memory;
  - determine a final value for at least the likely first character based on the likely first, likely second and likely third character data stored in the memory,
    - wherein determining the final value is performed without the user inputting a space gesture or selecting a button to accept the likely first character, and
    - wherein determining the final value is performed by comparing the likely first, second and third characters to a linguistic database; and,
  - remove the likely first data character from the memory after determining the final value for at least the first character.

15. The apparatus of claim 14, wherein the input and output components are a touch-sensitive display,
- wherein the first character data is received on a select area of the touch-sensitive display, and
- wherein the second and third character data are sequentially received on the same area of the touch-sensitive display.

16. The apparatus of claim 14, wherein the likely first, second and third characters are Asian characters, and wherein the likely first character can be edited until it is removed from the memory.

17. The apparatus of claim 14, wherein the likely first and second characters are displayed on the display component before receiving the third character data, and wherein the determining comprises determining whether the received third character data represents punctuation.

18. The apparatus of claim 14, wherein the memory stores first and second words for comparison with the linguistic database, and wherein a determined final first word is removed from the memory when the first and second words acceptably match a phrase in the linguistic database.

19. The apparatus of claim 14, further comprising a recognition engine, wherein the recognition engine and the linguistic database are stored in the memory, and wherein the recognition engine is a software module configured to perform at least the determining of a likely displayable character based on a received handwritten character.

20. The apparatus of claim 14, further comprising:
- a portable power source;
- a wireless transceiver; and
- a touch-sensitive display.

* * * * *